United States Patent [19]
Novak

[11] 3,842,700
[45] Oct. 22, 1974

[54] MITER DEVICE

[76] Inventor: Edward P. Novak, 911 Shenk Ave., Erie, Pa. 16505

[22] Filed: Oct. 17, 1973

[21] Appl. No.: 407,209

[52] U.S. Cl. .................. 83/743, 83/471.3, 83/468, 83/522, 83/581, 83/486
[51] Int. Cl. ......................... B27b 9/04, B27b 5/20
[58] Field of Search .......... 83/468, 467, 486, 471.2, 83/471.3, 522, 581, 743, 745, 471, 454, 455, 83/441.1

[56] References Cited
UNITED STATES PATENTS

| | | | |
|---|---|---|---|
| 2,396,961 | 3/1946 | Meredith | 83/488 |
| 2,629,410 | 2/1953 | Caldwell | 83/485 |
| 2,818,892 | 1/1958 | Price | 83/454 |
| 3,586,075 | 6/1971 | Larsen | 83/441.1 |

*Primary Examiner*—Donald R. Schran

[57] ABSTRACT

A miter fixture made up of a bottom platelike member with an angularly adjustable fence fixed to it adjacent its first side and an upper plate. A link hinged to the upper plate at one end and hinged to the lower plate at the other end between the fence and the first side so that the upper plate can swing up and down in parallel relation to the bottom plate and the upper plate can further swing to a position generally perpendicular to the lower plate, so that a member to be sawed such as a plank can be sandwiched between the upper plate and the bottom plate. A saw guide is supported on the upper plate generally perpendicular to the fence so that the member supported between the upper plate and bottom plate can be sawed at a desired angle. One edge of the upper plate is in a plane generally parallel with the plane passing through the lower plate so that the saw blade will pass along the side of the two plates when sawing the member sandwiched between them.

7 Claims, 4 Drawing Figures

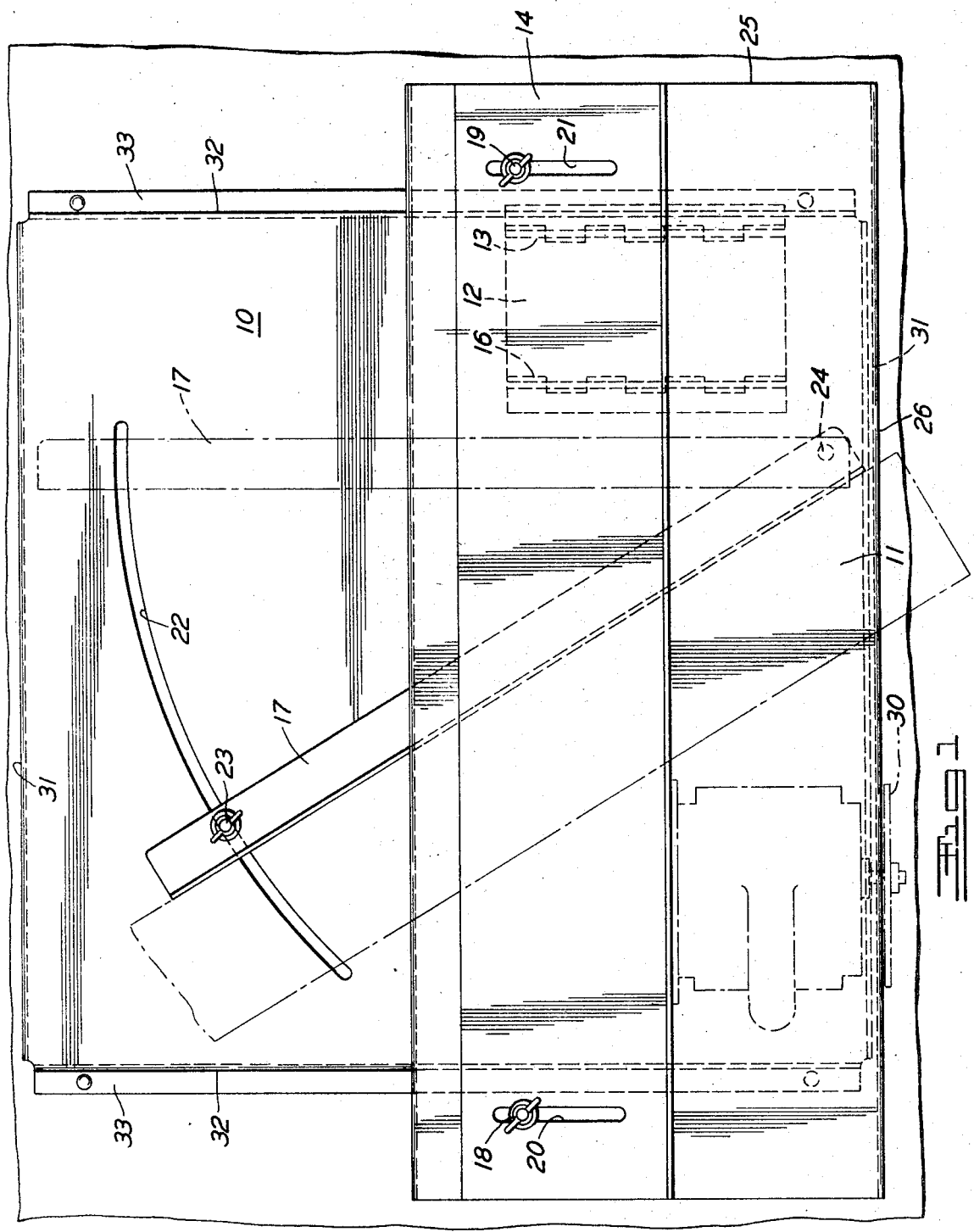

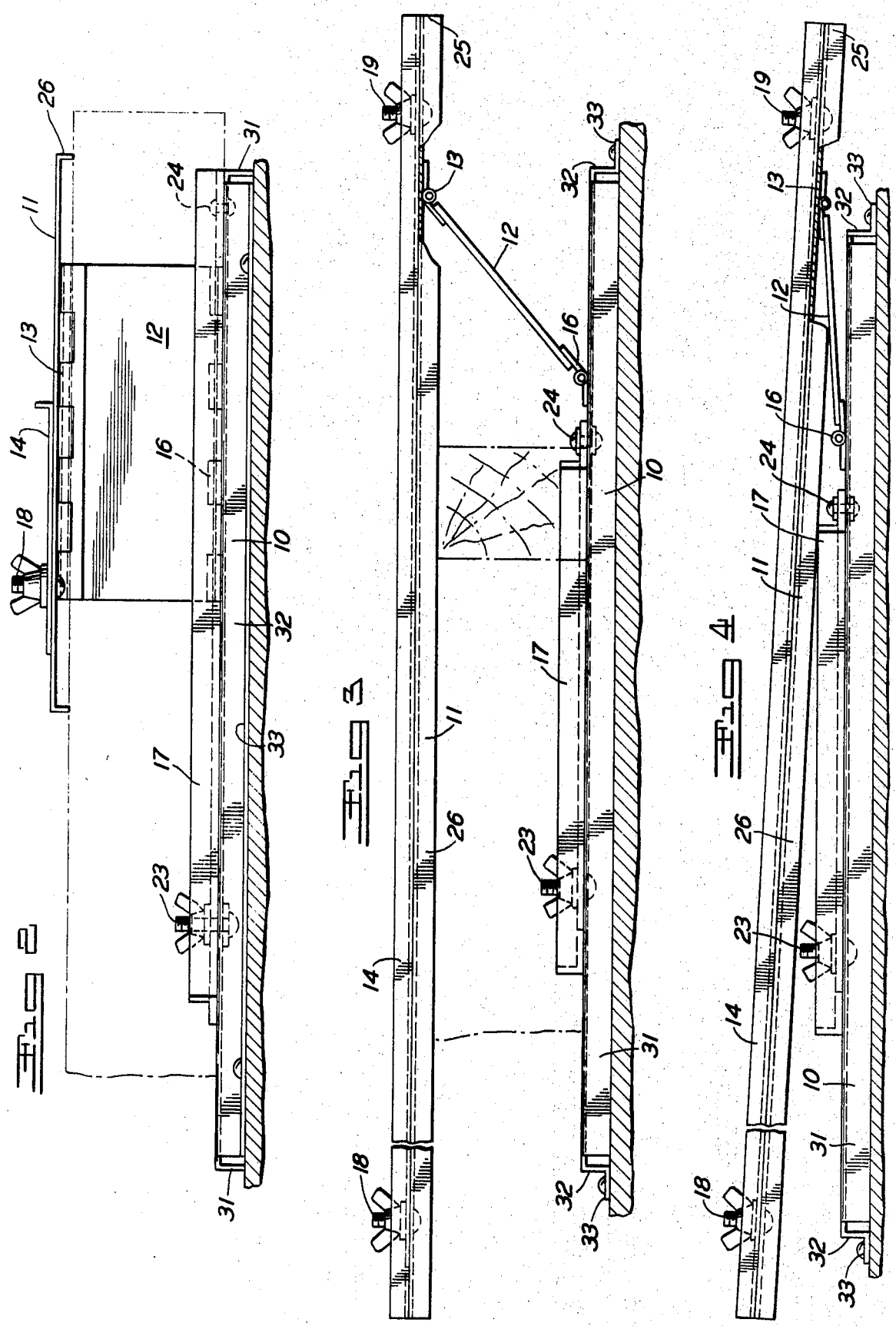

3,842,700

MITER DEVICE

REFERENCE TO PRIOR ART

This miter device is an improvement over the miter devices shown in U.S. Pat. Nos. 2,596,524; 2,770,265; 2,818,892; 2,940,484; and 3,078,885.

OBJECTS OF THE INVENTION

It is an object of the invention to provide an improved mitering mechanism.

Another object of the invention is to provide a fixture for holding wooden devices to be sawed.

Another object of the invention is to provide an improvement on the ordinary carpenter's miter box.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

FIG. 1 shows a top view of the miter fixture according to the invention with the upper plate swung generally perpendicular to the bottom plate.

FIG. 2 shows an end view of the miter fixture as shown in FIG. 1.

FIG. 3 shows a side view of the miter fixture.

FIG. 4 shows a side view similar to FIG. 3 with the upper plate in folded position.

DETAILED DESCRIPTION OF THE DRAWINGS

The fixture is made up generally of the upper platelike member 11 connected to the bottom platelike member 10 by link 12 in such a manner that a board to be sawed can be sandwiched between them. The angle fence 17 can be clamped to the bottom plate in the described angular position and the saw fence adjusted to accommodate a conventional electric saw. The upper platelike member 11 is about half the width of the bottom platelike member 10. The upper platelike member 11 projects beyond the end at each side of the lower platelike member 10. The link 12 is hinged to the upper platelike member 11 at 13, which is spaced from the first edge 25 of the lower platelike member a distance equal approximately to the length of the link 12, so that the upper platelike member 11 can be moved to a position generally perpendicular to the bottom platelike member 10 whenever a board is inserted in the fixture on top of the lower platelike member and against angle fence 17.

The platelike members 10 and 11 can be made of relatively thin sheets of metal having their edges bent down at their ends forming flanges 31 and 32 which may be held in place to a working surface by flanges 33 or the platelike members could be made of sheet material like plywood or Masonite.

The link 12 is also a platelike member approximately the same width as top platelike member 11 hinged to the bottom platelike member 10 at 16 and at a position adjacent the fence 17. The fence 17 is angular in cross section and is pivoted to the bottom platelike member 10 at 24 and has a second bolt 23 extending through the arcuate slot 22, thereby clamping the fence in adjusted position relative to the bottom platelike member and generally parallel to the plane of the link 12. The saw guide 14 is adjustably held to the upper plate by means of bolts 18 and 19, which extend through holes in the saw guide and through the slots 20 and 21 in the upper plate so that the position of the saw guide 17 is in the form of an angle section and can be adjusted relative to the edge 26 of the upper platelike member.

Thus, the operator will first adjust the fence 17 to the angular position that will give the desired angle of cut on the member to be sawed and will them adjust the saw guide by means of bolts 18 and 19 so that the saw blade 30 will just clear the edge of the upper platelike member 11 as the saw is guided across the plate by the edge of the saw guide 14. The operator will then place the plank or member to the fence 17. He will then swing the upper platelike member 11 down onto the plank to a position generally parallel to bottom plate 10 and sandwich the member to be sawed between the upper plate 11 and the bottom plate 10. He will then support his electric saw 30 on the upper platelike member 11 against the saw guide 14 and slide the saw across the top of the upper plate 11 thereby cutting the member at the desired angle.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A miter device for use with an electric saw comprising,
    an upper platelike member,
    a bottom platelike member,
    link means connecting said upper platelike member to said bottom platelike member whereby said upper platelike member can swing upward into a generally perpendicular position relative to the said bottom platelike member and can further move into a plane generally parallel to said bottom platelike member,
    and fence means on said bottom platelike member adapted to hold a board in selected angular relation to said upper platelike member,
    and a saw guide adjustably supported on said upper platelike member for guiding a saw for cutting a board supported between said platelike members.

2. The miter device recited in claim 1 wherein said link means is hinged to said upper platelike member at an intermediate part and hinged to said bottom platelike member at an intermediate part.

3. The miter device recited in claim 1 wherein said upper platelike member is approximately half the width of said bottom platelike member.

4. The miter device recited in claim 1 wherein said fence is in the form of a member generally angular in cross section swingably connected to said bottom platelike member at one end,
    and a slot in said bottom platelike member adjacent the second end of said fence,
    and a bolt extending through said second end of said guide member and ito said slot whereby said fence can be swung relative to said bottom platelike member.

5. The miter device recited in claim 1 wherein said link means connecting said upper platelike member to said bottom platelike member comprises a platelike member approximately equal in width to the width of said upper platelike member and hinged to said upper platelike member at a first end and hinged to said bottom platelike member at a second end.

6. The miter device recited in claim 5 wherein said upper platelike member is hinged to said link at a position spaced from one end of said upper platelike member a distance approximately equal to the length of said upper platelike member.

7. The miter device recited in claim 6 wherein said saw guide comprises a platelike member having a first bolt extending through its first end and a second bolt extending through its second end, and two spaced slots in said upper platelike member receiving said bolts whereby said saw guide can be adjusted relative to said edge of said upper platelike member.

* * * * *